United States Patent
Yoshikawa et al.

(10) Patent No.: US 9,696,862 B2
(45) Date of Patent: Jul. 4, 2017

(54) CAPACITANCE TYPE TOUCH PANEL

(71) Applicants: SMK Corporation, Tokyo (JP);
KABUSHIKI KAISHA TOKAI RIKA DENKI SEISAKUSHO, Aichi (JP)

(72) Inventors: Osamu Yoshikawa, Tokyo (JP); Takao Imai, Aichi (JP)

(73) Assignees: SMK Corporation, Tokyo (JP);
KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/941,655

(22) Filed: Nov. 15, 2015

(65) Prior Publication Data

US 2016/0070388 A1 Mar. 10, 2016

Related U.S. Application Data

(63) Continuation of application No. PCT/JP2015/001648, filed on Mar. 24, 2015.

(30) Foreign Application Priority Data

Sep. 4, 2014 (JP) ................................. 2014-180674

(51) Int. Cl.
G06F 3/045 (2006.01)
G06F 3/044 (2006.01)
G06F 3/041 (2006.01)

(52) U.S. Cl.
CPC ............ *G06F 3/044* (2013.01); *G06F 3/0418* (2013.01)

(58) Field of Classification Search
CPC . G06F 3/02; G06F 3/041; G06F 3/045; G06F 3/042; G09G 5/00; B29C 65/00; B32B 27/00
See application file for complete search history.

(56) References Cited

U.S. PATENT DOCUMENTS

| | | | | |
|---|---|---|---|---|
| 9,342,201 B2 * | 5/2016 | Murase | ................... | G06F 3/044 |
| 2005/0152092 A1 * | 7/2005 | Sibrai | ................ | H03H 11/1291 |
| | | | | 361/271 |
| 2010/0085324 A1 * | 4/2010 | Noguchi | ................. | G06F 3/044 |
| | | | | 345/174 |

(Continued)

FOREIGN PATENT DOCUMENTS

| | | |
|---|---|---|
| JP | 2001-125744 A | 5/2001 |
| JP | 2012-248035 A | 12/2012 |

*Primary Examiner* — Pegeman Karimi

(57) ABSTRACT

A capacitance type touch panel is provided which distinguishes a noise signal with ease and detects an input operation position with high accuracy, without extensively modifying the structure of a touch panel. The capacitance type touch panel is provided with capacitance change judgment unit for comparing a voltage variation level R(n,m) of a detection electrode S(n) detected by capacitance detection unit with a detection threshold value. If the voltage variation levels R(n,m) of all the detection electrodes S(n) are equal to or more than the detection threshold value while outputting a detection signal to any drive area DV(m), it is assumed that noise occurs for the long period of outputting the detection signal to the drive area DV(m), and position detection unit does not detect the input operation position.

3 Claims, 4 Drawing Sheets

(56) References Cited

U.S. PATENT DOCUMENTS

2010/0283752 A1* 11/2010 Maeda .................... G06F 3/044
  345/173
2014/0132561 A1* 5/2014 Miyamoto ............ G06F 3/0418
  345/174
2015/0103048 A1* 4/2015 Nakayama .............. G06F 3/044
  345/174

* cited by examiner

| | S1 | S2 | S3 | S4 | S5 | S6 | S7 | S8 | S9 | S10 | S11 | S12 |
|---|---|---|---|---|---|---|---|---|---|---|---|---|
| DV(1) | 0 | 2 | 1 | 1 | 3 | 1 | 8 | 1 | 0 | 0 | 2 | 0 |
| DV(2) | 0 | 0 | 1 | 1 | 2 | 7 | 9 | 5 | 3 | 0 | 1 | 0 |
| DV(3) | 0 | 1 | 2 | 3 | 7 | 23 | 38 | 19 | 5 | 4 | 1 | 0 |
| DV(4) | 0 | 0 | 0 | 3 | 12 | 58 | 90 | 46 | 9 | 0 | 1 | 0 |
| DV(5) | 0 | 0 | 0 | 3 | 6 | 29 | 49 | 23 | 5 | 2 | 0 | 0 |
| DV(6) | 0 | 3 | 0 | 3 | 6 | 4 | 3 | 4 | 4 | 4 | 4 | 4 |

| A | Sum(m) | 16 | 48 | 80 | 112 | 144 | 110 | 177 | 88 | 272 | 304 | 336 | 375 |
|---|---|---|---|---|---|---|---|---|---|---|---|---|---|
| X | Value(16+32m) | | | | | | 176 | 208 | 240 | | | | |
| | A × X | | | | | | 19360 | 36816 | 21120 | | | | |

Sum: 375
77296

$$x = \frac{77296}{375} = 206.0$$

| B | Sum(n) | | | 80 | 194 | 101 | | |
|---|---|---|---|---|---|---|---|---|
| Y | Value (n×16) | | 16 | 32 | 48 | 64 | 80 | 96 |
| | B × Y | | | | 3840 | 12416 | 8080 | |

Sum: 375 / 24336

$$y = \frac{24336}{375} = 64.9$$

| | S1 | S2 | S3 | S4 | S5 | S6 | S7 | S8 | S9 | S10 | S11 | S12 |
|---|---|---|---|---|---|---|---|---|---|---|---|---|
| DV(1) | 0 | 2 | 1 | 1 | 3 | 1 | 8 | 1 | 0 | 0 | 2 | 0 |
| DV(2) | 0 | 0 | 1 | 1 | 2 | 7 | 9 | 5 | 3 | 0 | 1 | 0 |
| DV(3) | 0 | 1 | 2 | 3 | 7 | 23 | 38 | 19 | 5 | 14 | 11 | 10 |
| DV(4) | 10 | 10 | 10 | 13 | 22 | 68 | 100 | 86 | 19 | 10 | 10 | 10 |
| DV(5) | 10 | 10 | 10 | 13 | 6 | 29 | 49 | 23 | 5 | 2 | 1 | 0 |
| DV(6) | 0 | 3 | 0 | 3 | 6 | 4 | 3 | 4 | 4 | 4 | 4 | 4 |

CAPACITANCE TYPE TOUCH PANEL

CROSS REFERENCE TO RELATED APPLICATION

The contents of the following Japanese patent application and International patent application are incorporated herein by reference, Japanese Patent Application NO. 2014-180674 filed on Sep. 4, 2014, and International Patent Application NO. PCT/JP2015/001648 filed on Mar. 24, 2015.

FIELD

The present invention relates to a capacitance type touch panel that detects an input operation position from the arrangement position of detection electrodes on an insulation panel at which capacitance is changed by approach of an input operation member, and in particular, relates to a capacitance type touch panel that reliably detects an input operation position without the influence of noise.

BACKGROUND

Capacitance type touch panels, which detect the position of an input by an input operation member such as a finger, are categorized into a self capacitance type (one-wire type) and a mutual capacitance type (two-wire type). In the self capacitance type touch panels, detection electrodes having an increase in stray capacitance by approach of the input operation member are detected to detect the input operation position from the arrangement position of the detection electrodes. In the mutual capacitance type touch panels, an alternating current detection signal at a predetermined voltage level is output to drive electrodes, and detection electrodes at which detection voltages of the detection signal are decreased by approach of the input operation member are detected to detect the input operation position from the arrangement position of the detection electrodes. The former type has simpler structure because there is no need to provide the drive electrodes, but the latter mutual capacitance type is adopted in general because the stray capacitance to be detected is at a minute level of 10 to 20 pF of being difficult to detect.

In the mutual capacitance type touch panels, a plurality of drive electrodes to which the detection signal is output and a plurality of detection electrodes for detecting the detection voltages in which the detection signal manifests itself are arranged orthogonally to each other. A voltage variation level of the detection voltage is monitored at each individual intersection point at which the drive electrode and the detection electrode intersect. The input operation position is detected from the position of the intersection points of the detection electrodes that have the voltage variation levels equal to or more than a predetermined threshold value by approach of the input operation member (For example, Patent Literature 1).

Such capacitance type touch panels detect the input operation position from a variation in feeble capacitance around the detection electrodes, and hence are sensitive to noise occurring in a display device disposed in the vicinity of the touch panel and electrostatic noise in surrounding stray capacitance. The noise sometimes causes a false detection of the input operation position.

As a method for improving the detection accuracy of the input operation position by removing the noise, Patent Literature 2 proposes a touch panel in which an AC signal component is extracted as a noise signal from an analog signal detected by a sensor for detecting the input operation position, and the extracted AC signal component is reversed 180° in phase and added to the original analog signal, whereby the input operation position is detected from the analog signal in which the noise signal is canceled.

Also, Patent Literature 3 describes a capacitance type touch panel that is provided with sub sensors for removing noise, in addition to main sensors for detecting the input operation position, in the same input operation surface of the touch panel. In the capacitance type touch panel described in the Patent Literature 3, both of the main sensors and the sub sensors receive various types of noise signals occurring in the vicinity of the input operation surface. The signal received by the sub sensors is subtracted from the signals received by the main sensors by subtracters to remove noise, so that the input operation position is detected from the outputs of the subtracters, which include only signals by an input operation.

CITATION LIST

Patent Literature

Patent Literature 1: Japanese Patent Application Laid-Open No. 2012-248035

Patent Literature 2: Japanese Patent Application Laid-Open No. 2001-125744

Patent Literature 3: Japanese Patent No. 4955116

SUMMARY

Technical Problem

In the touch panel disclosed in Patent Literature 2 described above, a specific frequency and amplitude defined as noise are stored in advance in a filter to recognize a noise signal, so that other noise signals cannot be removed because it is not defined as the noise. Also, the input operation position is detected from the original analog signal subjected to a noise removal process by feedback. Thus, the addition of time for the noise removal process hinders the high-speed detection of the input operation position.

In the capacitance type touch panel described in Patent Literature 3, the sub sensors are necessarily provided in addition to the main sensors for detecting the input operation position. In the capacitance type touch panel, in particular, a lot of main sense lines (detection electrodes) intersect with a lot of drive lines (drive electrodes) in a matrix. Thus, complex wiring is required to route a sub sense line for the sub sensors in the same input operation surface while being insulated from the main sense lines and the drive lines, resulting in a complex structure and a complex manufacturing process of the touch panel.

Furthermore, the signal of the sub sense line is subtracted from the signal detected for each of the individual main sense lines. If the input operation surface becomes large and the number of the main sense lines is increased, a subtraction process as described above, which has to be performed on a per sense line basis, requires much time. It requires much time to detect the input operation position, thus hindering the high-speed detection of the input operation position.

Moreover, although the occurrence time of electrostatic noise is 5 μsec to 10 μsec in general, there are cases in which charge of the stray capacitance increases the potential of all of the many detection electrodes for a few seconds, and the addition of base noise thereto brings about the false detection of a plurality of input operation positions exceeding an input judgment threshold value. Also, in touch panels used as input devices for car navigation systems installed in cars and the like, high frequency noise of the order of four seconds sometimes occurs when starting an engine. The methods described in Patent Literatures 2 and 3 cannot remove such noise occurring for a long period of time.

Considering the problems described above, an object of the present invention is to provide a capacitance type touch panel that distinguishes a noise signal with ease and detects an input operation position with high accuracy, without extensively modifying the structure of a touch panel.

Solution to Problem

To achieve the above object, a capacitance type touch panel according to one aspect of the present invention includes a plurality of detection electrodes S(n), a detection signal generating circuit, a plurality of drive areas DV(m), a drive control unit, electrode selection unit, capacitance detection unit, position detection unit, and capacitance change judgment unit. The plurality of detection electrodes S(n) are arranged in an input operation area, which is sufficiently wider than the width of an input operation member along a first direction of an insulation panel, at a regular pitch in the first direction along a second direction orthogonal to the first direction. The detection signal generating circuit generates an alternating current detection signal at a predetermined voltage level. The plurality of drive areas DV(m) are arranged at a regular pitch in the second direction of the insulation panel along the first direction. The plurality of drive areas DV(m) each intersect with all of the plurality of detection electrodes S(n) at an insulation distance away. The drive control unit selects a specific one of the plurality of drive areas DV(m), and outputs a detection signal to the selected drive area DV(m). The electrode selection unit sequentially selects a specific one of the plurality of detection electrodes S(n). The capacitance detection unit detects a detection voltage appearing due to the detection signal in the detection electrode S(n) selected by the electrode selection unit while the detection signal is output to the drive area DV(m) selected by the drive control unit, and detects a voltage variation level R(n,m) in the detection voltage from a state without approach of the input operation member. The position detection unit identifies the detection electrode S(n) having the voltage variation level R(n,m) equal to or more than a predetermined input judgment threshold value and the drive area DV(m), to which the detection signal is output, in the vicinity of the detection electrode S(n), owing to a change in capacitance of the selected detection electrode S(n) and the drive area DV(m) to which the detection signal is output, in the vicinity of the detection electrode S(n) by approach of the input operation member. The position detection unit detects an input operation position of the input operation member in the first and second directions, on the basis of an arrangement position (n) of the identified detection electrode S(n) on the insulation panel in the first direction and an arrangement position (m) of the identified drive area DV(m) on the insulation panel in the second direction. The capacitance change judgment unit compares the voltage variation level R(n,m) of the detection electrode S(n) detected by the capacitance detection unit with a detection threshold value that is set at a predetermined value less than the input judgment threshold value. If the voltage variation levels R(n,m) of all detection electrodes S(n) selected by the electrode selection unit are equal to or more than the detection threshold value while the drive control unit outputs the detection signal to any selected drive area DV(m), the position detection unit does not detect the input operation position even when the voltage variation level R(n,m) of any detection electrode S(n) exceeds the input judgment threshold value.

The distance between the detection electrodes S(n) on both ends of the input operation area in the first direction is longer than the width of the input operation member. Thus, if the input operation member approaches the input operation area, it does not usually happen that the voltage variation levels R(n,m) of all the detection electrodes S(n), including the detection electrodes S(n) on both ends, are equal to or more than the detection threshold value while the drive control unit is outputting the detection signal to any selected drive area DV(m). On the other hand, noise that occurs continuously for the period of time exceeding one scan period in which the electrode selection unit selects all the detection electrodes S(n) causes the voltage variation levels R(n,m) of all the detection electrodes S(n) to be equal to or more than the detection threshold value. Thereby, the noise occurring in the detection electrodes for a relatively long period can be distinguished from the input operation by the input operation member. The position detection unit does not detect an input operation position that possibly has a detection error.

In the capacitance type touch panel according to a second aspect, the detection threshold value is set at a value higher than at least the voltage variation level R(n,m) of the detection voltage occurring in the detection electrode S(n) owing to the base noise.

The capacitance change judgment unit neglects the voltage variation level R(n,m) owing to the base noise itself, and distinguishes only the noise occurring for a long period.

In the capacitance type touch panel according to a third aspect, the input judgment threshold value is set at twice or more the detection threshold value.

Even if the base noise is added to the voltage variation level R(n,m) equal to or less than the detection threshold value, the added voltage variation level R(n,m) does not exceed the input judgment threshold value.

According to the first aspect of the present, it is possible to detect the input operation position with high accuracy without extensively modifying the structure of a capacitance type touch panel, without detecting an input operation position possibly having a detection error due to noise occurring for a relatively long period, and without the influence of noise.

According to the second aspect of the present invention, it is possible to reliably respond to the noise occurring for a long period without the influence of the base noise, and hence prevent the false detection of the input operation position owing to the noise.

According to the third aspect of the present invention, even if the base noise is added to the voltage variation level R(n,m) equal to or less than the detection threshold value, the added voltage variation level R(n,m) does not exceed the input judgment threshold value and is not misjudged as an input operation.

BRIEF DESCRIPTION OF DRAWINGS

FIG. 3 is an explanatory view showing a method for detecting an input operation position from the voltage variation levels R(m,n).

FIG. 4 is an explanatory view showing the voltage variation levels R(m,n) when long period noise occurs in the capacitance type touch panel 1.

DESCRIPTION OF EMBODIMENTS

Figure 1:
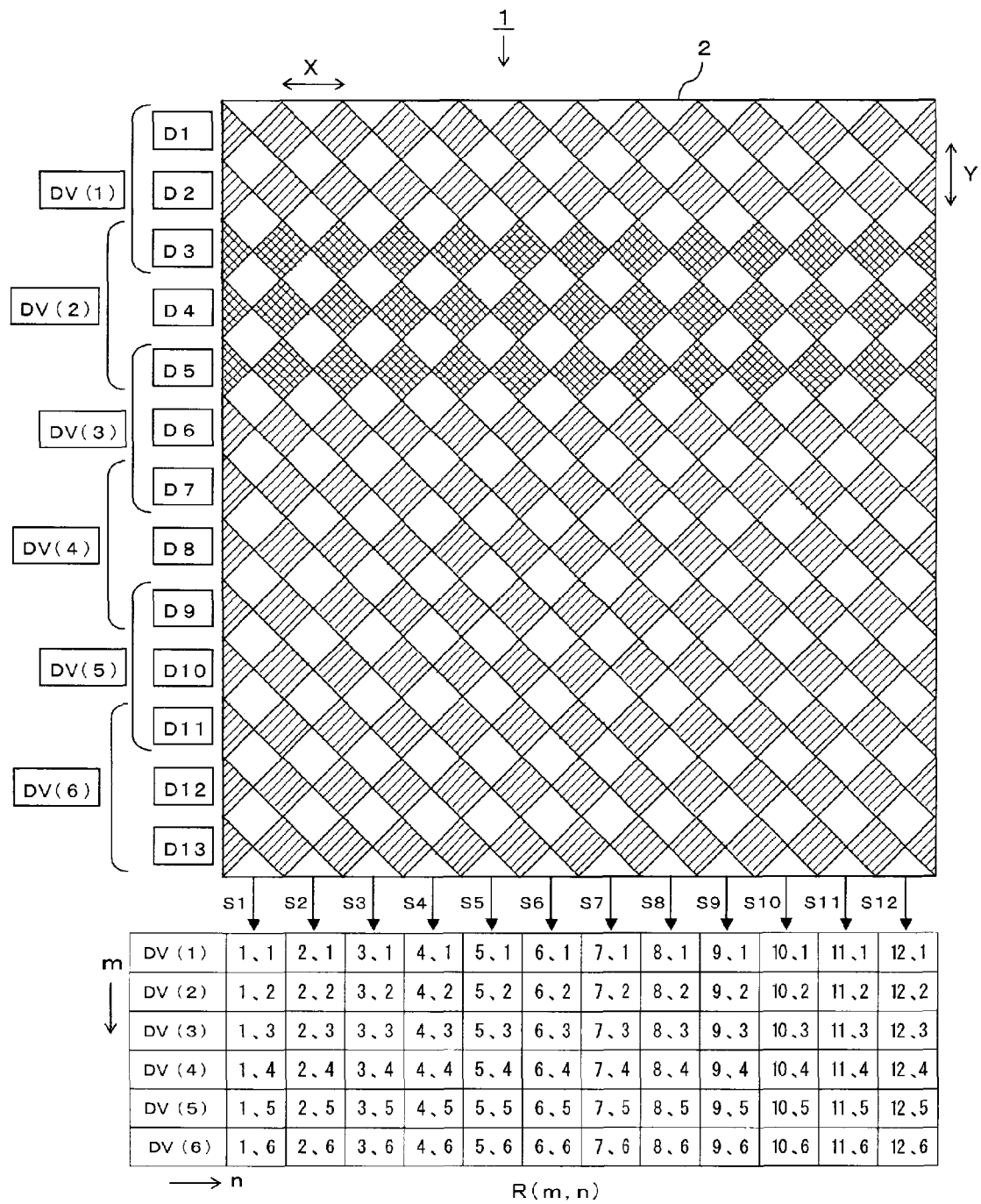
FIG. 1 is an explanatory view illustrating the relationship between drive areas DV(m) and voltage variation levels R(m,n) appearing in detection electrodes S(n) in a capacitance type touch panel 1 according to an embodiment of the present invention.

A capacitance type touch panel (hereinafter simply called touch panel) 1 according to an embodiment of the present invention will be described below with reference to FIGS. 1 to 4. As shown in FIG. 1, this touch panel 1 uses, as an input operation area, the entire surface of an insulation panel 2 the lengths of which in XY directions are much longer than those of an input operation member such as a finger, which will be described later. In the input operation area, thirteen drive electrodes D1 to D13 each having a rhombus pattern extending in the X direction and twelve detection electrodes S1 to S12 each having a rhombus pattern extending in the Y direction are arranged, such that intersection points thereof are insulated from one another. The thirteen drive electrodes D1 to D13 are arranged at an equal pitch in the Y direction, and the twelve detection electrodes S1 to S12 are arranged at an equal pitch in the X direction. The rhombus patterns of one type of the electrodes complement gaps of the rhombus patterns of the other type of the electrodes, so that a staggered pattern appears as a whole.

Front surfaces of the drive electrodes D1 to D13 and the detection electrodes S1 to S12, which are arranged in a lattice pattern on the insulation panel 2, are covered with a not-shown transparent insulation sheet to protect these electrodes and prevent a malfunction by direct contact of the input operation member such as the finger with the electrodes. In other words, in the touch panel 1 according to this embodiment, an input operation is performed by making the input operation member contact or close to the transparent insulation sheet, and an increase in capacitance between each drive electrode D and the input operation member owing to approach of the input operation member through the transparent insulation sheet is read from voltage variation levels R(m,n) of detection voltages appearing in the detection electrodes S(n) in the vicinity of the input operation member, to thereby detect the input operation position. On the basis of this detection principle, each of the pitch between the drive electrodes D1 to D13 and the pitch between the detection electrodes S1 to S12 takes such a value that the input operation position can be detected even if the input operation is performed by making the input operation member close to any position in the input operation area on the insulation panel 2. Here, both of the pitches are set at 4 mm, for example.

Figure 2:
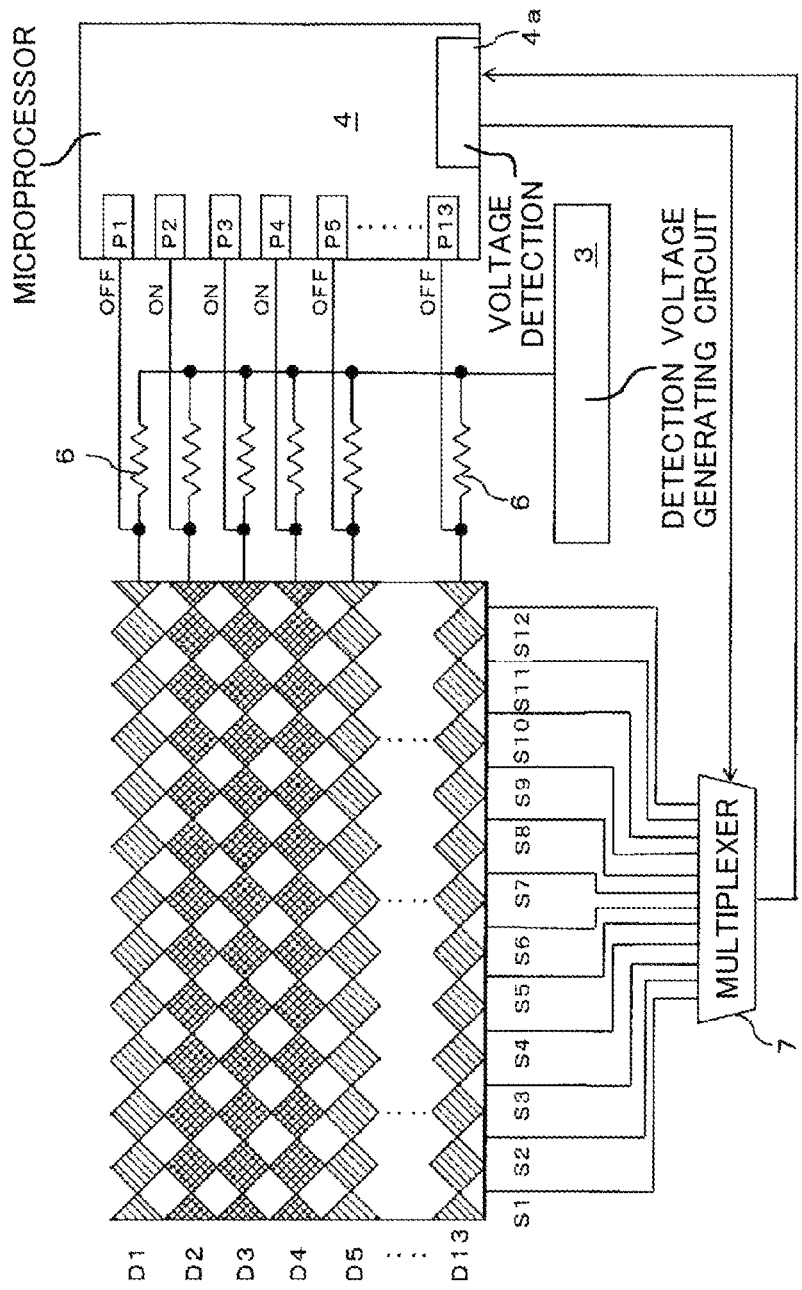
FIG. 2 is a schematic circuit diagram of the capacitance type touch panel 1.

As shown in FIG. 2, each of the drive electrodes D1 to D13 is connected through a damping resistor 6 for removing noise to a detection voltage generating circuit 3. The detection voltage generating circuit 3 outputs a detection signal having a pulse height of $V_0$ in a form of a rectangular wave alternating current signal. At connection points between each of the drive electrodes D1 to D13 and the damping resistor 6, input and output ports P1 to P13 of the microprocessor 4 are connected to the corresponding drive electrodes D1 to D13, respectively.

If the input and output port P is in an OFF mode in which the input and output port P is in the state of an output port, the potential of the drive electrode (D1, D5, and D13 in the drawing) connected to the input and output port is stabilized at a potential of the output port (for example, 0 V if the potential of the output port is in an "L" level, and VCC if the potential of the output port is in a "H" level). Accordingly, the detection signal in the form of the rectangular wave alternating current signal output from the detection voltage generating circuit 3 is not output to the drive electrode D (D1, D5, and D13 in the drawing) connected to the input and output port P. On the other hand, if the input and output port P is in an ON mode in which the input and output port P is in the state of an input port, the input port P is in a high impedance state. Thus, the rectangular wave alternating current signal output from the detection voltage generating circuit 3 does not flow into the input and output port P (P2 to P4 in the drawing), but the detection signal in the form of the rectangular wave alternating current signal is output to the drive electrode D (D2 to D4 in the drawing) connected to that input and output port P. In other words, the microprocessor 4 controls the output of the detection signal to the drive electrodes D connected to the input and output ports P only by making arbitrary one or two or more of the input and output ports P into the state of the output port or the input port in an arbitrary sequence.

In this embodiment, as shown in FIG. 1, the drive electrodes D are grouped into a drive area DV(m) for every three drive electrodes D adjoining in the Y direction. The drive area DV(m) and another drive area DV(n') adjoining each other in the Y direction overlap at the drive electrode D arranged therebetween, and the overlapping drive electrode D composes both of the drive areas DV(m) and DV(n'). In this manner, six types of drive areas DV(m) (m is an integer of 1 to 6) are set in the thirteen drive electrodes D arranged in the insulation panel 2.

The microprocessor 4 puts the input and output ports P corresponding to the drive area DV(m) into the ON mode in a sequence of the drive areas DV(m) along the Y direction, to synchronously output the rectangular wave alternating current signal i.e. the detection signal having a pulse height of $V_0$ to the three drive electrodes D constituting that drive area DV(m). By doing so, the detection signal is output to all the drive electrodes D arranged in the input operation area of the insulation panel 2 by six-time drive control for outputting the detection signal on a per drive area DV(m) basis.

The twelve detection electrodes S(n) (n is an integer of 1 to 12) are connected to a multiplexer 7 to switch connection to a voltage detection circuit 4a of the microprocessor 4 by control of the microprocessor 4. The microprocessor 4 sequentially switches connection to the twelve detection electrodes S(n) at intervals of a drive control period (hereinafter called one line scan period TL) of each drive area DV(m), to transmit a detection voltage appearing in the connected detection electrode S(n) to the voltage detection circuit 4a of the microprocessor 4.

While the detection signal is output to the three drive electrodes D of the drive area DV(m), the voltage detection circuit 4a reads the pulse heights (detection voltages) of the rectangular wave alternating current signal appearing in the detection electrodes S(n) through capacitance C0 in the detection electrodes S(n) intersecting the drive area DV(m). Since this capacitance C0 is at approximately a constant value, the detection voltage does not vary from a normal voltage level V0 that is proportional to an output voltage of the detection signal, unless there is no approach of the input operation member and no change in stray capacitance in the drive area DV(m). On the other hand, when the input operation member is brought close to the drive area DV(m) to which the detection signal is output or the detection electrode S(n), the capacitance increases between the drive area DV(m) and the input operation member or between the detection electrode S(n) and the input operation member, and part of the rectangular wave alternating current signal flows into the input operation member and hence the detection voltage appearing in the detection electrode S(n) decreases. The shorter the distance between the input operation member and the drive area DV(m) or between the input operation member and the detection electrode S(n), the more the detection voltage decreases from the normal voltage level V0. To calculate the input operation position from a variation in the detection voltage, the microprocessor 4 represents the variation in the detection voltage as the voltage variation level R(m,n), in which the potential difference between the normal voltage level V0 and the detection voltage detected by the voltage detection circuit 4a is inverted and binarized. Thus, the voltage variation level R(m,n) represents a difference i.e. a decrease in the detection voltage with respect to the normal voltage level V0 by approach of the input operation member. If, for example, a dielectric such as a water droplet having a higher dielectric constant than air adheres between the drive area DV(m) and the detection electrode S(n), the detection voltage may become higher than the normal voltage level V0 set in calibration. Therefore, the voltage variation level R(m,n) in a state where the detection voltage is equal to the normal voltage level V0 is set at a median value (128*d* in the case of 8 bits). If the detected voltage variation level R(m,n) is less than the median value, the detected voltage variation level R(m,n) is neglected because it is assumed to be caused by the adhesion of the water droplet or the like.

The microprocessor 4 controls the multiplexer 7 to switch connection of all the detection electrodes S(n) intersecting the drive area DV(m) to which the detection signal is output, at intervals of the one line scan period TL in which each drive area DV(m) is operated. The operation of the multiplexer 7 is repeated while the detection signal is output to the drive areas DV(1) to DV(6) sequentially in the Y direction, so that the voltage variation levels R(m,n) of m rows and n columns, as shown in FIG. 1, are obtained by scanning an entire frame of the input operation area. Since the one line scan period TL is 4 msec in this embodiment, the scan period Tf of one frame (one screen) is 4 msec*6 lines, that is, 24 msec.

Since the voltage variation level R(m,n) represents the variation in the detection voltage appearing in the detection electrode S(n) intersecting the drive area DV(m) during the operation thereof, the voltage variation level R(m,n) increases by approach of the input operation member to the intersection point between the drive area DV(m) and the detection electrode S(n). Therefore, a position detection unit of the microprocessor 4 compares the voltage variation levels R(m,n) of m rows and n columns with each other, to find a maximum value out of the surrounding voltage variation levels R(m,n). Then, the position detection unit compares the maximum voltage variation level R(m,n) with an input judgment threshold value set at a predetermined value. If the maximum voltage variation level R(m,n) is equal to or more than the input judgment threshold value, it is assumed that the input operation member has approached the vicinity of the intersection point, so that the input operation position is detected.

However, capacitance change judgment unit of the microprocessor 4 compares the voltage variation levels R(m,n) of m rows and n columns with a detection threshold value, which is set at a predetermined value less than the input judgment threshold value. If all the voltage variation levels R(m,n) detected as to any drive area DV(m) are equal to or more than the detection threshold value, it is determined that long period noise exceeding the one line scan period TL has occurred. Therefore, the position detection unit does not detect the input operation position, even when the voltage variation level R(m,n) equal to or more than the input judgment threshold value is detected in the same frame.

In the touch panel 1 described above, the six types of drive areas DV(m) are operated in a sequential manner from above in the input operation area, and while each drive area DV(m) is operated, the twelve detection electrodes S(n) are sequentially selected from the left. On the basis of the detection voltages of the selected detection electrodes S(n), the voltage variation levels R(m,n) of six rows and twelve columns, as shown in FIGS. 3 and 4, are detected in the input operation area of the one frame. For the sake of ease of explanation, as shown in FIGS. 3 and 4, the voltage variation levels R(m,n) binarized by the voltage detection circuit 4a are represented as decimal values, and "0" represents a case where the detection voltage read from the detection electrode S(n) is the normal voltage level V0.

The detection voltage of the detection electrode S(n) varies in accordance with base noise, irrespective of whether the input operation member is near or far. The base noise is dark noise by which the detection voltage varies due to uncertain factors such as a detection error of a circuit, change of surrounding environment, and the like, and causes variations in the voltage variation levels R(m,n) of the respective detection electrodes S(n) within values less than 8. Thus, in order for the capacitance change judgment unit of the microprocessor 4 not to confuse the base noise with the occurrence of the long period noise, the detection threshold value is set at "8" that is slightly higher than the maximum voltage variation level R(m,n) due to the base noise.

As described later, the input operation position is calculated from the maximum voltage variation level R(m,n) and the voltage variation levels R(m,n) surrounding the maximum voltage variation level R(m,n). There are often cases where when the maximum voltage variation level R(m,n) is as low as slightly above the input judgment threshold value, the surrounding voltage variation levels R(m,n) are less than the input judgment threshold value. However, for the purpose of calculating the input operation position with high accuracy using a more number of voltage variation levels R(m,n), in this embodiment, the surrounding voltage variation levels R(m,n) are used for calculating the input operation position as long as the individual surrounding voltage variation levels R(m,n) are equal to or more than the detection threshold value even though less than the input judgment threshold value. In other words, the detection threshold value defines a minimum value of the voltage variation level R(m,n) to be usable as data for calculating the input operation position.

Accordingly, the input judgment threshold value is set at "16," that is, "8" equal to or more than the variations of the base noise is added to "8" of the detection threshold value, such that the surrounding voltage variation levels R(m,n) slightly lower than the input judgment threshold value do not become lower than the detection threshold value irrespective of the presence or absence of the base noise, and such that the surrounding voltage variation levels R(m,n)

that are originally lower than the detection threshold value and should not be used for the calculation of the input operation position do not exceed the input judgment threshold value, preventing misuse for the calculation of the input operation position and false detection of the input operation.

The calculation of the input operation position and the detection of the long period noise by the microprocessor 4 of the touch panel 1 will be concretely described below with reference to FIGS. 3 and 4. FIG. 3 shows the voltage variation levels R(m,n) of six rows and twelve columns detected by scanning the one frame, when an input operation is performed by bringing the finger as the input operation member close to the vicinity of the intersection point between the drive area DV(4) and the detection electrode S(7) in a normal state without the occurrence of the long period noise.

At the intersection points (m,n) that are away from the input operation position to such an extent that the capacitance owing to the input operation member is negligible, the detection voltages read from the detection electrodes S(n) are basically equal to the normal voltage level V0, and hence the voltage variation levels R(m,n) become "0" at the intersection points (m,n), unless being varied within values around from 0 to 7 by the influence of the base noise. On the other hand, the voltage variation level R(4,7) at the intersection point (4,7) in the vicinity of the input operation position is maximized when compared with the surroundings, that is, "90" exceeding the input judgment threshold value "16." Thus, it is assumed that the input operation position is in the vicinity of the intersection point (4,7) at which the maximum value is detected in the X and Y directions in the drawing.

However, there are cases where the voltage variation level R(m,n) at any intersection point is maximized because of common mode noise, a detection error, and the like irrespective of the input operation member. To distinguish such a maximum value from the occurrence of the maximum value caused by the input operation, the maximum value is neglected when being less than the input judgment threshold value "16," and the following calculation of the input operation position is not performed. When a plurality of maximum values equal to or more than the input judgment threshold value are detected, it is assumed that input operations are performed at the same time in the vicinity of respective intersection points, and thus the detection of the input operation position is performed repeatedly at each intersection point.

In FIG. 3, since the maximum value exceeding the input judgment threshold value "16" is only "90" at the intersection point (4,7) of the drive area DV(4) and the detection electrode S(7), the voltage variation levels R(m,n) (diagonally shaded in the drawing) at eight intersection points adjoining to the intersection point (4,7) are compared with the detection threshold value "8." The voltage variation levels R(m,n) equal to or more than the detection threshold value are designated as effective data to be used for calculating the input operation position.

An input operation position x in the X direction is detected by calculation from a weighted average of the effective data in the X direction. To be more specific, a weight is assigned to each arrangement position of the twelve detection electrodes S(n) on the insulation panel 2, with assigning a weight "16" to an initial value and a weight "32" to the pitch in the X direction. The reason why the weight of "16" is assigned to a detection electrode S(1) is that the input operation member has an effect thereon only from one side of the X direction. Then, the effective data is summed up in the Y direction in each of detection electrodes S(6-8), so that a Sum(6) of "110," a Sum(7) of "177," a Sum(8) of "88," and a sum total of "375" are obtained. At the same time, by multiplying each of the sum values Sum(6-8) of the detection electrodes S(6-8) by the weight assigned to the arrangement position of the respective detection electrodes S(6-8), a sum total of "77296" is obtained. The input operation position in the X direction calculated from the weighted average is 206.1, that is, "77296"/"375," and therefore a position of 206.1 (between the detection electrodes S(6) and S(7)) weighted in the X direction is detected as the input operation position in the X direction.

In a like manner, an input operation position y in the Y direction is calculated from a weighted average of the effective data in the Y direction. A weight is assigned to position in the Y direction, with assigning a weight "16" to the pitch of the six types of drive areas DV(m) and adding a weight "16" to a midpoint position of each drive area DV(m). Then, effective data is summed up in the X direction in each of the drive areas DV(3-5), so that a Sum(3) of "80," a Sum(4) of "194," a Sum (5) of "101," and a sum total of "375" are calculated. At the same time, by multiplying each of the sum values Sum(3-5) of the drive areas DV(3-5) by the weight assigned to the midpoint position of each of the drive areas DV(3-5) in the Y direction, a sum total of "24336" is obtained. The input operation position in the Y direction calculated from the weighted average is 64.9, that is, "22436"/"375," and therefore a position of 64.9 (between the drive areas DV(4) and DV(5)) weighted in the Y direction is detected as the input operation position in the Y direction.

FIG. 4 shows the voltage variation levels R(m,n) of the individual intersection points (m,n) if noise occurs in the touch panel 1 for approximately 5 msec from the time of output of the detection signal to the drive area DV(3) and selection of the detection electrode S(10) to the time of output of the detection signal to the drive area DV(5) and selection of the detection electrode S(4), in the scan period Tf of the one frame (one screen) for detecting the voltage variation levels R(m,n) of the intersection points (m,n) of the entire input operation area.

According to the voltage variation levels R(m,n) shown in FIG. 4, the voltage variation level R(4,7) at the intersection point (4,7) has a maximum value "100" exceeding the input judgment threshold value "16," and hence an input operation position is assumed to be in the vicinity thereof. However, the capacitance change judgment unit of the microprocessor 4 judges that the long period noise longer than the one line scan period has occurred, because the voltage variation levels R(4,n) of all of the detection electrodes S(n) exceed the detection threshold value "8" in the one line scan period TL for outputting the detection signal to the drive area DV(4), and therefore does not calculate the input operation position in this frame. As a result, it is possible to prevent the false detection of the input operation and the input operation position caused by the occurrence of the long period noise.

In the above embodiment, the operation of the drive areas DV(m) is controlled in an ascending order of the Y direction. However, the order of the operation of the drive areas DV(m) and the connection to the individual detection electrodes S(n) while each drive area DV(m) is operated can be arbitrarily changeable by the control of the microprocessor 4. Also, each drive area DV(m) is composed of a plurality of drive electrodes D adjoining in the Y direction, but may be composed of one drive electrode D.

In the touch panel 1 described above, the long period noise is detected from the voltage variation levels R(m,n)

obtained by scanning the one frame (one screen) by which the detection voltages are detected from all the detection electrodes S(n) of the six types of drive areas DV(m). On the contrary, the input operation position may be detected by using a plurality of voltage variation levels R(m,n) of each intersection point (m,n) obtained by a repetition of the scanning of the one frame (one screen).

The input judgment threshold value is set at twice the detection threshold value in the above embodiment, but is settable at an arbitrary value as long as the value is equal to or more than the detection threshold value.

The detection threshold value is defined as a lower limit of the voltage variation level R(m,n) to be used for calculating the input operation position. However, another boundary value may define the confines of the voltage variation level R(m,n) to be used for calculating the input operation position.

INDUSTRIAL APPLICABILITY

The embodiment of the present invention is applicable for capacitance type touch panels used in such environment that long period noise continuing for a few msec to a few seconds occurs.

REFERENCE SIGNS LIST 1 capacitance type touch panel
2 insulation panel
3 detection voltage generating circuit
4 microprocessor (drive control unit, electrode selection unit)
4a voltage detection circuit (capacitance detection unit)
7 multiplexer (electrode selection unit)
DV(m) drive area
S(n) detection electrode

The invention claimed is:

1. A capacitance type touch panel comprising:
a plurality of detection electrodes that are arranged in an input operation area, which is sufficiently wider than a width of an input operation member in a first direction of an insulation panel, at a regular pitch in the first direction along a second direction orthogonal to the first direction;
a detection signal generating circuit for generating an alternating current detection signal at a predetermined voltage level;
a plurality of drive areas that are arranged at a regular pitch in the second direction of the insulation panel along the first direction, the plurality of drive areas each intersecting with all of the plurality of detection electrodes at an insulation distance away;
a drive control unit for selecting a specific one of the plurality of drive areas, and outputting a detection signal to the selected drive area;
electrode selection unit for sequentially selecting a specific one of the plurality of detection electrodes;
capacitance detection circuit for detecting a detection voltage appearing due to the detection signal in the detection electrode selected by the electrode selection unit while the detection signal is output to the drive area selected by the drive control unit, and detecting a voltage variation level in the detection voltage from a state without approach of the input operation member;
position detection circuit for identifying the detection electrode having the voltage variation level equal to or more than a predetermined input judgment threshold value and the drive area, to which the detection signal is output, in the vicinity of the detection electrode, owing to a change in capacitance of the selected detection electrode and the drive area to which the detection signal is output, in the vicinity of the detection electrode by approach of the input operation member, the position detection circuit detecting an input operation position of the input operation member in the first and second directions, on the basis of an arrangement position of the identified detection electrode on the insulation panel in the first direction and an arrangement position of the identified drive area on the insulation panel in the second direction; and
capacitance change judgment circuit for comparing the voltage variation level of the detection electrode detected by the capacitance detection circuit with a detection threshold value that is set at a predetermined value less than the input judgment threshold value, wherein
when the voltage variation levels of all detection electrodes selected by the electrode selection unit are equal to or more than the detection threshold value while the drive control unit outputs the detection signal to any selected drive area, the position detection circuit does not detect the input operation position even when the voltage variation level of any detection electrode exceeds the input judgment threshold value.

2. The capacitance type touch panel according to claim 1, wherein the detection threshold value is set at a value higher than at least the voltage variation level of the detection voltage occurring in the detection electrode owing to a base noise.

3. The capacitance type touch panel according to claim 2, wherein the input judgment threshold value is set at twice or more the detection threshold value.

* * * * *